United States Patent
Pegram et al.

(10) Patent No.: US 10,502,241 B2
(45) Date of Patent: Dec. 10, 2019

(54) LINEAR ACTUATOR

(71) Applicant: Metrol Springs Limited, Northampton (GB)

(72) Inventors: Christopher John Pegram, Northampton (GB); Paul Terence Hynes, Northampton (GB)

(73) Assignee: Metrol Springs Limited (GB)

( * ) Notice: Subject to any disclaimer, the term of this patent is extended or adjusted under 35 U.S.C. 154(b) by 18 days.

(21) Appl. No.: 15/866,921

(22) Filed: Jan. 10, 2018

(65) Prior Publication Data

US 2018/0195535 A1 Jul. 12, 2018

(30) Foreign Application Priority Data

Jan. 12, 2017 (GB) .................................. 1700561.2

(51) Int. Cl.
*F15B 15/14* (2006.01)
*B30B 1/38* (2006.01)
(Continued)

(52) U.S. Cl.
CPC ............ *F15B 15/1428* (2013.01); *B30B 1/34* (2013.01); *B30B 1/38* (2013.01); *F15B 15/1452* (2013.01); *F16F 9/0281* (2013.01)

(58) Field of Classification Search
CPC ........ F16F 9/325; F16F 9/3242; F16F 9/0281; F15B 15/1428; B30B 1/34
See application file for complete search history.

(56) References Cited

U.S. PATENT DOCUMENTS 4,110,868 A * 9/1978 Imazaike .................. E05F 5/10
16/66
4,664,362 A * 5/1987 Hennells ............... F16F 9/0218
188/322.17

FOREIGN PATENT DOCUMENTS

DE 3635390 4/1988
EP 2908024 8/2015
(Continued)

OTHER PUBLICATIONS

Kaller Catalouge, 2016, pp. 1 and 306 to 308 (NPL1).
Extended European Search Report issued in connection with EP Application No. 18250002.5 dated Apr. 14, 2018, pp. 1 to 8.

*Primary Examiner* — Abiy Teka
(74) *Attorney, Agent, or Firm* — Merek, Blackmon & Voorhees, LLC (57) ABSTRACT

A linear actuator is disclosed. The linear actuator comprises a cylinder portion and a base portion. The cylinder portion comprises a housing defining internally a compression chamber for containing a fluid and comprising a piston assembly that can reciprocate within the compression chamber. The housing further defines a cylinder port in fluid communication with said compression chamber. The base portion defines a first base port and a second base port and a passage extending therebetween fluidly communicating the first base port with the second base port, and comprises valve means operable to control the flow of fluid through the second base port, in which the valve means is actuatable between an open condition in which the flow of fluid through the second base port is permitted, and a closed condition in which the flow of fluid through the second base port is substantially prevented. The cylinder portion is releasably engageable with the base portion such that the cylinder portion and the base portion may be arranged in an engaged condition in which engaged condition the cylinder port and the second base port are in fluid communication.

17 Claims, 9 Drawing Sheets

(51) Int. Cl.
 B30B 1/34 (2006.01)
 F16F 9/02 (2006.01)

(56) References Cited

FOREIGN PATENT DOCUMENTS

| | | |
|---|---|---|
| GB | 2230385 | 10/1990 |
| JP | H09136196 | 6/1997 |
| JP | 2009103220 | 5/2009 |

\* cited by examiner

LINEAR ACTUATOR

CROSS REFERENCE TO RELATED APPLICATIONS

This application claims priority from United Kingdom patent application No. 17 00 561.2 filed 12 Jan. 2017, the whole contents of which are incorporated herein by reference in their entirety.

BACKGROUND OF THE INVENTION

1. Field of the Invention

The present invention relates to linear actuators, and in particular to linear actuators in the form of pneumatic cylinders. More particularly, the present invention relates to gas springs.

2. Description of the Related Art

Linear actuators are mechanisms that produce linear forces. Linear actuators have utility in a wide range of applications, notably in industrial machinery, for automated movement of components of the machinery or for damping such components. Two types of linear actuator of particular interest are hydraulic cylinders and pneumatic cylinders. Hydraulic and pneumatic cylinders use a working fluid, in the case of a hydraulic cylinder typically a hydraulic oil and in the case of a pneumatic cylinder typically an inert gas, to control the movement of a piston either outwardly (or inwardly) of a cylinder portion.

One particular use of a 'spring' type pneumatic cylinder is in metal-pressing/stamping machinery. In such a use, the cylinder is typically referred to as a 'gas spring'. In a typical mechanical press used in a metal pressing process, the ram drives the upper die part downwardly towards the lower die part, and the workpiece, or 'blank', is supported therebetween by the blank-holder. The function of the blank-holder is generally to hold the workpiece in place during the pressing operation and to auto-lift the pressed workpiece from the lower die following pressing. The blank-holder typically takes the form of a clamp about the perimeter of the workpiece.

Whilst the position of the lower die is generally fixed, the blank-holder is usually configured to be movable so as to allow the upper die to engage the workpiece at a position a short distance above the lower die, and to allow the workpiece to then travel downwardly with the upper die before contacting the lower die. A 'press-cushion' (also called a 'die' or 'bed' cushion) is conventionally provided under the blank-holder. The primary function of the press cushion is to provide a flexible, controlled, blank-holder force, to control material flow of the workpiece during the pressing operation.

Typically such a press-cushion comprises of a single motor unit, often an air-bag, equipped with a plurality of cushion pins for engaging the blank-holder at different locations. As will be appreciated, it is often the case that a single press machine may be used for pressing of different parts, and so the cushion pins may be moved to engage the blank-holder at different locations to facilitate localized control of the blank-holder force to optimise material flow to suit the particular shape of the pressing. Although such conventional press cushions are generally effective, they incur certain practical disadvantages, and so in certain applications it may be desirable to replace such a press cushion with an array of gas springs.

The replacement of such press cushions with gas springs overcomes many of the problems encountered with conventional press cushions and it is known that gas springs function effectively in substitute of a conventional press cushion. However, whilst the function of conventional gas springs is satisfactory for use in substitute of a press cushion, their construction does not lend itself so readily to such a use. In particular, problems are encountered using gas springs in substitute of a press cushion on a pressing machine used for multiple different pressings where different blank-holder force distribution patterns are required.

Existing gas springs of the prior art comprise generally of a single piece housing defining internally a compression chamber within which a piston reciprocates, and including a gas inlet/outlet port defined by the housing permitting charging of the chamber with a gas (typically Nitrogen). The housing is usually bolted to a bed of the pressing machine. When used as a press cushion, the plurality of gas springs in an array are typically fluidly coupled to a central control unit by hard pipes carrying nitrogen gas under elevated pressure conditions.

However, in such a use of gas springs a problem is encountered inasmuch that, following pressing of a first part, to re-purpose the pressing machine for pressing of a differently shaped part requiring a different distribution of blank-holder force, it is necessary to reconfigure the gas springs, by unbolting the gas springs from their original position and reattaching them to the bed at a new position, and subsequently reconfiguring the gas supply pipes. It will be appreciated that this method of repositioning gas springs incurs significant time costs and can result in an (often expensive) pressing machine standing redundant whilst an operative reconfigures the gas spring array. It is desirable therefore to provide a linear actuator, and more particularly a gas spring, having a construction which obviates the aforementioned problems encountered with conventional gas springs.

BRIEF SUMMARY OF THE INVENTION

According to a first aspect of the present invention, there is provided a linear actuator comprising: a cylinder portion and a base portion; the cylinder portion comprising a housing defining internally a compression chamber for containing a fluid and comprising a piston assembly that can reciprocate within the compression chamber, said housing further defining a cylinder port in fluid communication with said compression chamber; the base portion defining a first base port and a second base port and a passage extending therebetween fluidly communicating said first base port with said second base port, and comprising a valve operable to control the flow of fluid through said second base port, in which said valve is actuatable between an open condition in which the flow of fluid through the second base port is permitted, and a closed condition in which the flow of fluid through the second base port is substantially prevented; in which said cylinder portion is releasably engageable with said base portion such that said cylinder portion and said base portion may be arranged in an engaged condition in which engaged condition said cylinder port and said second base port are in fluid communication.

Preferably, a substantially fluid-tight seal is formed between said cylinder port and said second base port when said cylinder portion and said base portion are in said engaged condition.

Preferably, said cylinder portion and said base portion are configured as to be engageable from a disengaged condition to said engaged condition and separable from said engaged condition to a disengaged condition in a way that the fluid coupling between the cylinder port of the cylinder portion and the second base port of the base portion is made or broken by the said engagement and disengagement procedures respectively without requiring a separate manual operation.

Preferably, the housing of said cylinder portion defines a recess projecting inwardly from an exterior surface thereof, in which said recess is generally cylindrical in form.

Preferably, said base portion defines a flange projecting outwardly from an exterior surface thereof, said flange defining a generally tubular collar annular about said second base port having outer width and depth dimensions corresponding to inner width and depth dimensions of said recess defined by said cylinder portion, and in which the flange of said base portion is configured to be partially received in said recess of said cylinder portion when said cylinder portion and said base portion are in said engaged condition.

Preferably, said valve is configured to substantially prevent fluid flow through said second base port when said cylinder portion and said base portion are in a disengaged condition.

Preferably, said valve is configured to automatically actuate to the closed condition in which the flow of fluid across the valve is substantially prevented when said cylinder portion and said base portion are in a disengaged condition.

Preferably, said valve is a valve device.

Preferably, said valve is biased towards said closed condition.

Preferably, said valve is a one-way valve.

Preferably, said base portion comprises a main body.

Preferably, said valve is constructed and arranged relative to the main body of said base portion to be actuated towards said open condition when said cylinder portion and said base portion are in said engaged condition.

Preferably, said cylinder portion comprises an actuating member configured to act upon said valve in a way to actuate said valve towards said open condition when said cylinder portion and said base portion are in said engaged condition.

Preferably, said actuating member is configured to engage said valve to act upon said valve in a way to actuate said valve towards said open condition when said cylinder portion and said base portion are in said engaged condition.

Preferably, said actuating member projects outwardly of an exterior surface of said cylinder housing.

Preferably, said cylinder portion further comprises an annular guide ring installed in said recess annular about said second port.

Preferably, said guide ring comprises of a material having a lower hardness characteristic to the material from which said flange of said base portion is constructed.

Preferably, said guide ring is releasably installed in said recess so as to permit removal of said guide ring.

Preferably, said linear actuator is a gas spring.

According to a second aspect of the present invention, there is provided a kit of parts for assembling a linear actuator, the kit comprising: a cylinder portion and a base portion; the cylinder portion comprising a housing defining internally a compression chamber for containing a fluid and comprising a piston assembly that can reciprocate within the compression chamber, said housing further defining a cylinder port in fluid communication with said compression chamber; the base portion defining a first base port and a second base port and a passage extending therebetween fluidly communicating said first base port with said second base port, and comprising valve means suitable for controlling the flow of fluid through said second base port, in which said valve means is actuatable between an open condition in which the flow of fluid through the second base port is permitted, and a closed condition in which the flow of fluid through the second base port is substantially prevented; in which said cylinder portion is releasably engageable with said base portion such that said cylinder portion and said base portion may be arranged in an engaged condition in which engaged condition said cylinder port and said second base port are in fluid communication.

BRIEF DESCRIPTION OF THE DRAWINGS

The invention will now be described by way of example only with reference to the accompanying drawings, which are purely schematic and not to scale, of which.

DETAILED DESCRIPTION OF EXAMPLE EMBODIMENTS

Figure 1:
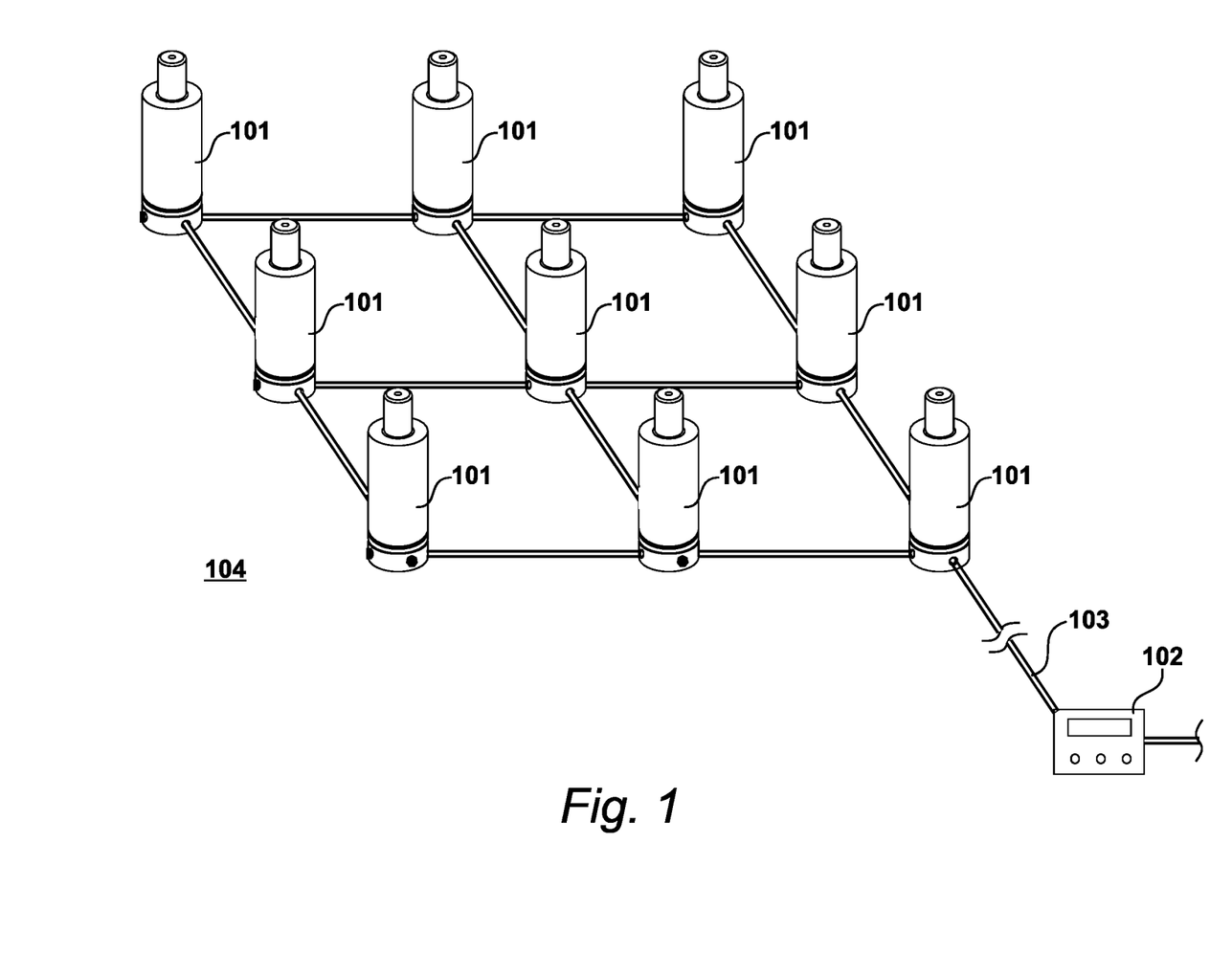
FIG. 1 shows an example of an environment in which the present invention can be used.

FIG. 1

An example of an environment in which the present invention can be used is shown in FIG. 1.

Aspects of the present invention relate to an improved construction of a linear actuator. The term linear actuator as used herein includes both hydraulic and pneumatic cylinders. A specific embodiment of the invention described herein in detail is a pneumatic cylinder. More particularly, the specific embodiment of the invention described herein is a pneumatic cylinder configured as a 'gas spring'. As will be understood, a gas spring is a type of spring that, unlike a typical metal spring, uses a compressed gas, contained in a cylinder and compressed by a piston, to exert a force.

One use for such a gas spring that is of particular interest to the present applicant is a gas spring for supporting a blank-holder in a metal-pressing machine. Thus, in the specific embodiment described herein, the gas spring is a gas spring suitable for exerting a force on a blank-holder resting thereon in a metal pressing machine. It will of course be appreciated however that, although the specific embodiment of the invention described herein is a gas spring, the invention could alternatively embody an alternative type of linear actuator, for example, in an alternative embodiment the invention may take the form of a hydraulic 'ram' cylinder. Moreover, it will be appreciated that gas springs, and linear actuators more generally, have utility in a number of different applications other than for supporting a blank-holder in a pressing machine, and it should be understood that the invention is not limited in this regard to any one particular intended application rather has broader utility.

Referring to the Figure, in this environment a plurality of linear actuators, in the form of gas springs 101 according to one embodiment of the present invention, are arranged in an array. In the example, the plurality of gas springs 101 are being used in substitute of a press cushion in metal pressing machinery.

Thus, in the embodiment, the function of the array of gas springs 101 is to exert a retarding and restorative force on a blank-holder, supported on said array, in order to control the flow of a workpiece (typically a flat metal sheet) held by the blank-holder during a pressing operation.

As illustrated, the plurality of gas springs 101 are arranged in a generally square 3×3 array. In the embodiment, the plurality of gas springs are arranged in a grid configuration and exchange nitrogen gas with a remote gas supply via central control unit 102 and hard pipes 103. As illustrated, in the specific embodiment, only one of said gas springs 101 is directly fluidly coupled to said remote gas supply via said central control unit 102, with the other gas springs 101 in the array fluidly coupled to that first directly connected gas spring, and to each other gas spring in the array. Thus, under the control of central control unit 102, said plurality of gas springs 101 may be charged with nitrogen gas through hard pipes 103 to a required pressure in order to achieve a desired blank-holder force. It will be appreciated that, dependent on the functionality of said central control unit, and the configuration of hard pipes 103, each of said gas springs 101 in the array may be charged to different gas pressures or to the same gas pressure.

In the embodiment, the array of gas springs 101 is installed on a bed 104 of a pressing machine.

Figure 2:
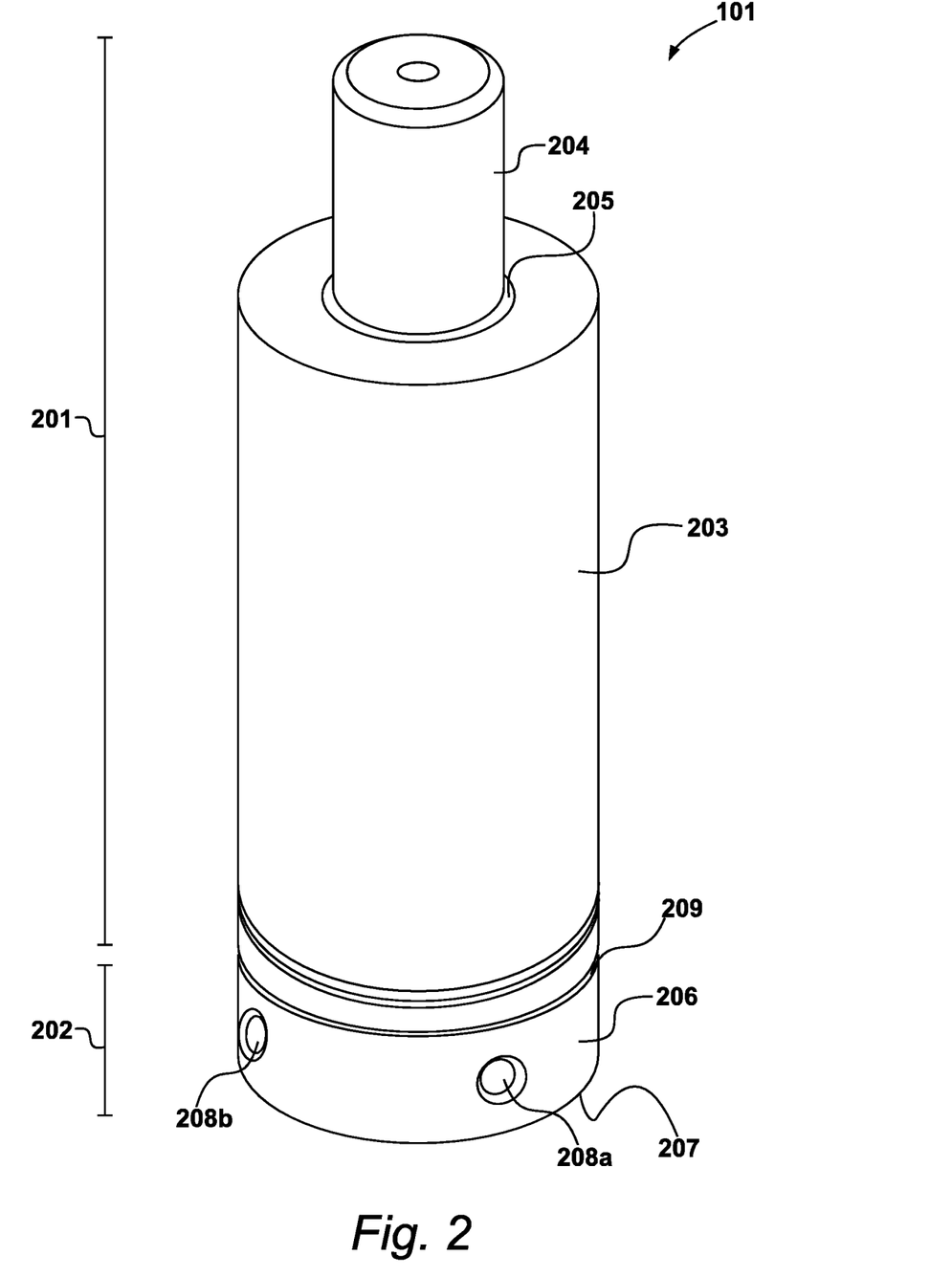
FIG. 2 shows the gas spring in isolation in a perspective view.

FIG. 2

Gas spring 101 is shown in isolation in a perspective view in FIG. 2.

Referring to the Figure, gas spring 101 comprises generally of a cylinder portion 201 and a base portion 202. The cylinder portion 201 is releasably engageable with the base portion 202 such that the pair may be placed in an 'engaged' condition (as shown in FIG. 2), or conversely the cylinder portion may be separated from the base portion such that the pair are in a 'detached' condition, in the way that will be described further with particular reference to FIGS. 3A and 3B.

As illustrated, said cylinder portion 201 comprises a generally cylindrical housing 203 defining internally a generally cylindrical compression chamber (not visible in the Figure). The housing 203 is open at one axial end to receive piston 204 which can reciprocate within the compression chamber and which extends therefrom generally coaxially with the housing 203. A substantially fluid-tight seal member 205 is provided annular about said piston 204, sealing the gas between said piston 204 and said housing 203. As will be understood by the skilled person, the piston 204 may reciprocate within the compression chamber between an extended condition in which the piston extends to a maximum extent from the housing, i.e. where the piston is at its minimum extent of insertion into the compression chamber, and a retracted condition in which the piston extends to a minimum extent from the housing, i.e. where the piston is at its maximum extent of insertion into the compression chamber.

In the embodiment, said base portion 202 comprises a main body 206 having a generally disc-shaped form, defining a lower surface 207 for engagement with a surface on which the gas spring is to be supported, for example, the bed 104 of a pressing machine, and an upper surface 209 with which said cylinder portion 201 is engaged to thereby support the cylinder portion on the support surface 104.

Said base portion 202 comprises at least a first base port 208a. As will be understood, said first base port 208a is configured for fluid coupling to a remote gas supply via central control unit 102 through hard pipes 103. Said first base port 208a thus serves as an inlet port through which the gas spring may be charged with nitrogen gas from a remote supply as will be described further with reference to FIGS. 3 to 6. Thus, said first base port 208a may be internally threaded to receive a correspondingly threaded union joint of the hard pipes 103 to form a substantially fluid-tight seal therebetween. In the specific embodiment, said base portion 201 comprises a plurality of such first base ports, in the specific embodiment four first base ports 208a, 208b, 208c, 208d (206c and 208d not visible in the Figure), which are substantially alike and which join a common manifold defined internally by the main body 206 (as is more clearly shown in FIG. 4B). Said plurality of base ports allow for 'daisy-chaining' of the gas springs, and allow a parallel fluid coupling of the plurality of gas springs in an array as previously described.

Figure 3A:
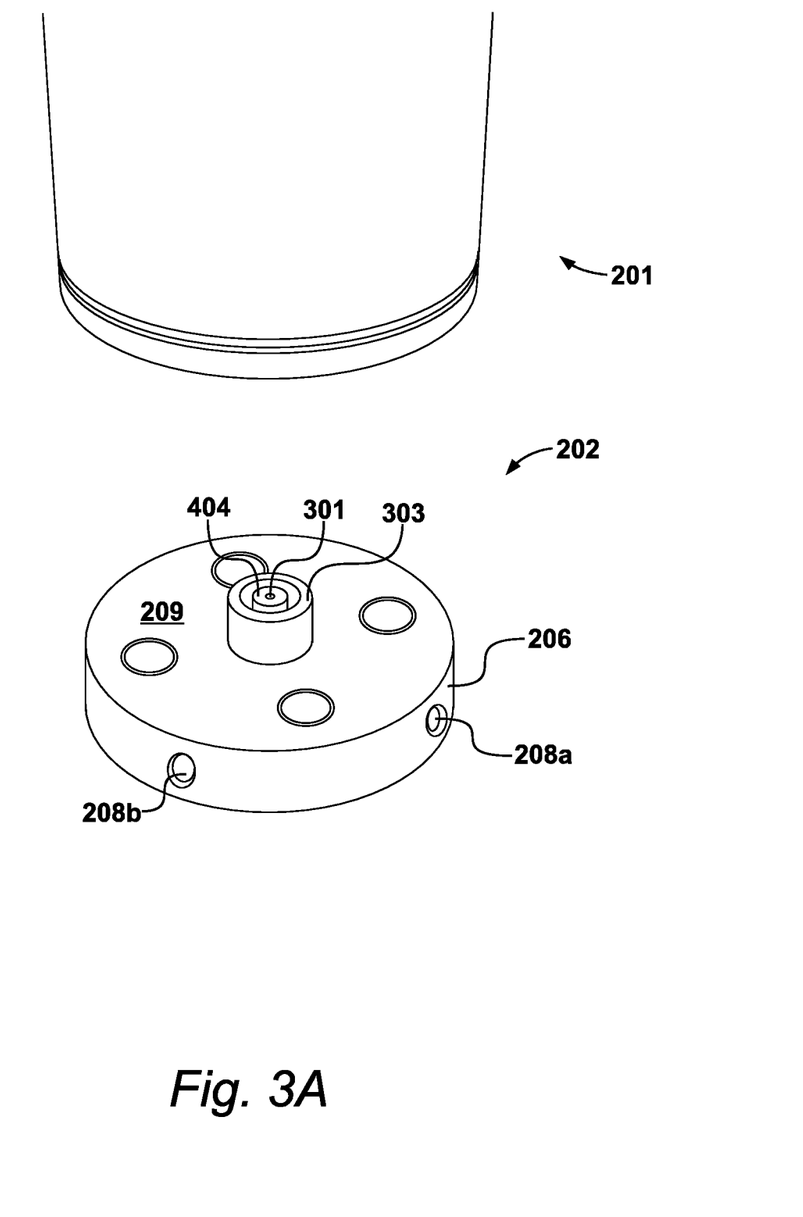
FIGS. 3A and 3B show the gas spring in first and second partial perspective views in which said cylinder portion and said base portion are in a detached condition.
Figure 3B:
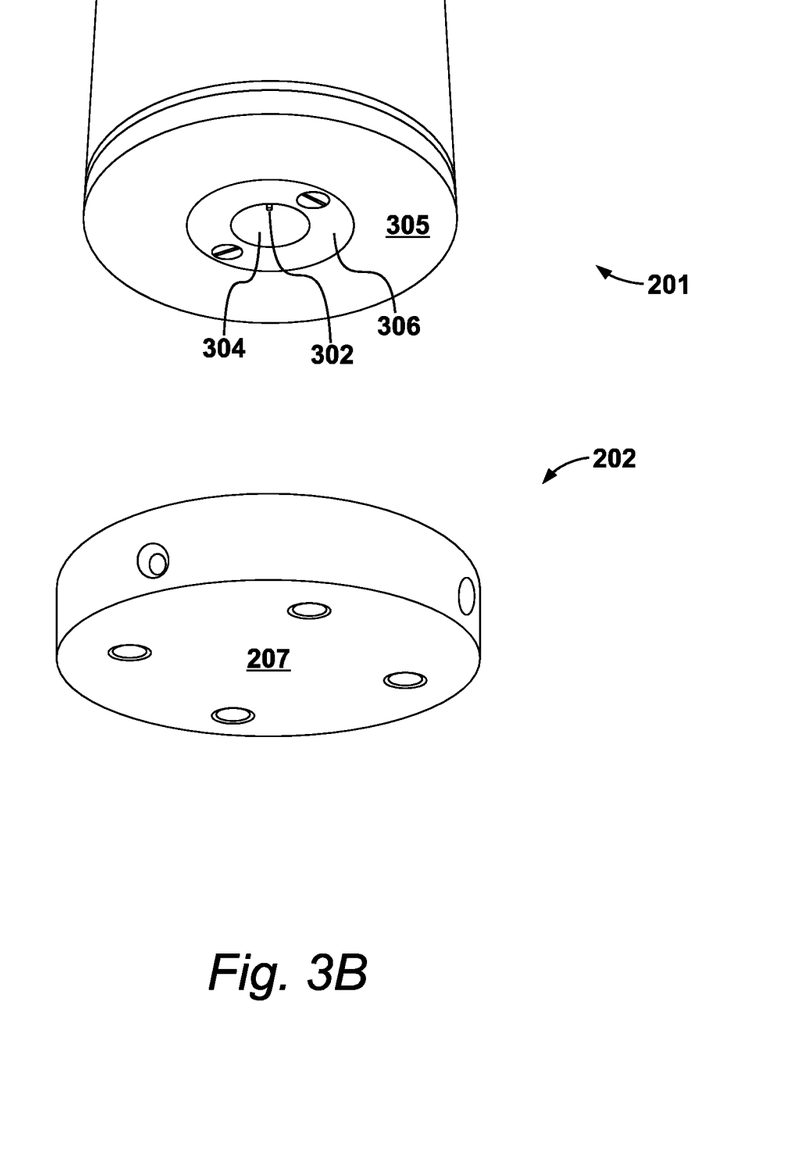

FIGS. 3A & 3B

In the Figures gas spring 101 is shown in first and second partial perspective views in which said cylinder portion 201 and said base portion 202 are in a detached condition, i.e. in which said cylinder portion 201 is not engaged with said base portion 202. In FIG. 3A said gas spring 101 is shown in a partial top view and in FIG. 3B gas spring 101 is shown in a partial bottom view.

Referring to the Figures, said cylinder portion 201 is configured to be releasably engageable with, or conversely detachable from, said base portion. 202 Given that said base portion 202 may be fixed to the bed 104 of a pressing machine during use, and given that said base portion 202 defines said (at least one) first base port 208a which is configured for fluid coupling to said remote gas supply via hard pipes 103 as previously described, the releasable engagement between said cylinder portion 201 and said base portion 202 facilitates ready detachment of said cylinder portion from the bed 104 of a pressing machine. It will be understood that, with gas springs of the prior art, detachment of the gas springs from the bed of the pressing machine would typically require unbolting of the gas spring complete from the press bed, and detachment/reconfiguring of the circuit of hard pipes supplying gas to each gas spring from the remote supply.

Thus, as previously described said base portion 202 defines at least a first base port 208a, which first base port 208a is configured for fluid coupling to a remote gas supply and thus serves as a gas inlet/outlet port for the gas spring 101. Referring in particular to FIG. 3A, said base portion 202 further defines a second base port 301. As is shown more clearly in later Figures, said first base port 208a and said second base port 301 are in fluid communication via a common manifold defined internally by said main body 206.

Referring in particular to FIG. 3B, said cylinder portion 201 defines a cylinder port 302 in fluid communication with said compression chamber defined internally by said housing 203, the cylinder port 302 extending through the lower axial end of the housing thereby fluidly communicating the compression chamber with the environment.

In the embodiment, said housing 203 of said cylinder portion 201 and the main body 206 of said base portion 202 are dimensioned and configured, and in particular their respective outer surfaces are dimensioned, such that such that said second base port 301 and said cylinder port 302 are aligned, to facilitate fluid communication therebetween, when said cylinder portion 201 and said base portion 202 are in the engaged condition (described previously with reference to FIG. 2). In particular, as will be described further with reference to later Figures, in the embodiment the cylinder portion 201 and the base portion 202 are dimensioned such that a substantially fluid-tight seal is formed between said second base port 301 and said cylinder port 302 when said cylinder portion 201 and said base portion 202 are placed in the engaged condition (shown in FIG. 2). As will be understood, the fluid-coupling established between said second base port 301 and said cylinder port 302 when said cylinder portion 201 and said base portion 202 are placed in the engaged condition, establishes fluid communication between said first base port 208a and said compression chamber defined internally by said housing 203, and so allows charging of said compression chamber with gas from a remote supply via said hard pipes 103.

It will be appreciated that the term 'fluid-tight' when referring to the seal formed between components may be interpreted differently dependent on the characteristics of the fluid, in particular the viscosity and pressure of the fluid. In the context of the specific embodiment described herein, the term 'fluid-tight' is intended to define a seal that is substantially impervious to the passage of nitrogen gas at pressures in the range of approximately 20-150 Bar. That is to say, the term 'fluid-tight' should be interpreted as defining a seal which substantially prevents the passage of nitrogen gas at the specified pressures to pass therebetween so as to allow operational gas pressures within the sealed system to be achieved.

In the specific embodiment, said cylinder portion 201 and base portion 202 are configured to be readily engageable from a disengaged condition to the engaged condition, and readily separable from said engaged condition to a disengaged condition. Thus, it is preferred that the said engagement and separation procedures may be performed relatively quickly and easily by an operative, and preferably without the use of tools. In the specific preferred embodiment described herein, the terms 'readily engageable'/'readily separable' indicate that the cylinder portion 201 may be engaged/disengaged from the base portion 202 without the requirement for manual making/breaking of the fluid coupling therebetween. Rather, it is preferred that the act of engaging/disengaging the housing 203 of the cylinder portion 201 from the main body 206 of the base portion 202 should not be hindered by the requirement to manually make/break the fluid coupling between the second base port 301 and the cylinder port 302. That is to say, it is preferable that the fluid coupling between the second base port 301 and the cylinder port 302 does not require manual attention to be made/broken, rather the (substantially fluid-tight) fluid coupling is made/broken merely by engaging/disengaging the housing 203 of the cylinder portion 201 with the main body 206 of the base portion 202. Preferably, the engagement between said cylinder portion and said base portion is obtained without the use of physical fixings, for example, bolts or welding.

Preferably, said cylinder portion 201 and said base portion 202 are configured such that said cylinder portion 201 tends to be maintained stably in the engaged condition with respect to the base portion 202 under the force of gravity acting on the cylinder portion alone, i.e. without the need for physical fixings exerting a retaining force therebetween.

Referring to the Figures, in the specific embodiment said cylinder portion 201 and said base portion 202 define mutually co-operating profiles such that said base portion 202 provides lateral support to said cylinder portion 201 in the engaged condition sufficient to resist lateral movement therebetween during operation of the gas spring. As shown in the Figures, in the specific embodiment said main body 206 of said base portion 202 defines a flange projecting upwardly from said upper surface 209 in the form of a generally tubular collar annular 303 about said second base port 301, said second base port 301 being arranged substantially co-axially with said collar 303. Further, in the embodiment the housing 203 of said cylinder portion 201 defines a generally cylindrical recess 304 projecting inwardly from the lower axial end 305, the recess 304 having inner width and depth dimensions corresponding to outer width and height dimensions of said collar 303 of said base portion 202. In the embodiment, said cylinder port 302 is arranged substantially co-axially with said generally cylindrical recess 304.

Thus, as will be understood, said collar 303 is configured to be at least partially received in said recess 304 when said cylinder portion 201 and said base portion 201 are placed in the engaged condition. Generally, the purpose of the mutually co-operating collar 303 and recess 304 is to facilitate a desired alignment of said cylinder portion 201 relative to the base portion 202 when the pair are in the engaged condition, and to resist lateral movement therebetween (which would disrupt the alignment) during normal operation of the gas spring. More particularly, the primary purpose of the collar 303 and recess 304 is to conveniently facilitate correct alignment of the second base port 301 with the cylinder port 302, to thereby facilitate fluid communication, and a substantially fluid-tight seal, therebetween.

As shown particularly in FIG. 3B, in the embodiment said recess 304 of said cylinder portion 201 further comprises an annular guide ring 306 installed therein annular about said cylinder port 302 and generally co-axial therewith. Said guide ring 306 comprises of a material having a lower hardness characteristic than the main body 206 of the base portion 202 which defines collar 303. In the embodiment said guide ring 306 is releasably installed in said recess 304 so as to permit removal and/or replacement of the guide ring.

Thus, it will be appreciated that said guide ring is configured to assist in locating said collar 303 in the desired alignment relative to said recess 304. Said annular guide ring 306 is configured to define a central aperture having an inner width dimension closely matched to the outer width dimension of said collar 303 such that said collar 303 may be received closely therein in order that said collar 303 can be relatively precisely aligned with respect to said recess 304 (to thereby relatively precisely align said second base port 301 with said cylinder port 302). In the embodiment, guide ring 304 is formed of a relatively softer material than the material from which said collar 303 is formed such that said guide ring is sacrificial to said collar 303, thereby reducing wear on said collar 303 (and on the walls of said recess 304) which might otherwise occur when said collar is inserted into and removed from said recess during engagement/separation of said cylinder portion 201 with said base portion 202. Guide ring 306 may then be removed and replaced when it is excessively worn.

Figure 4A:
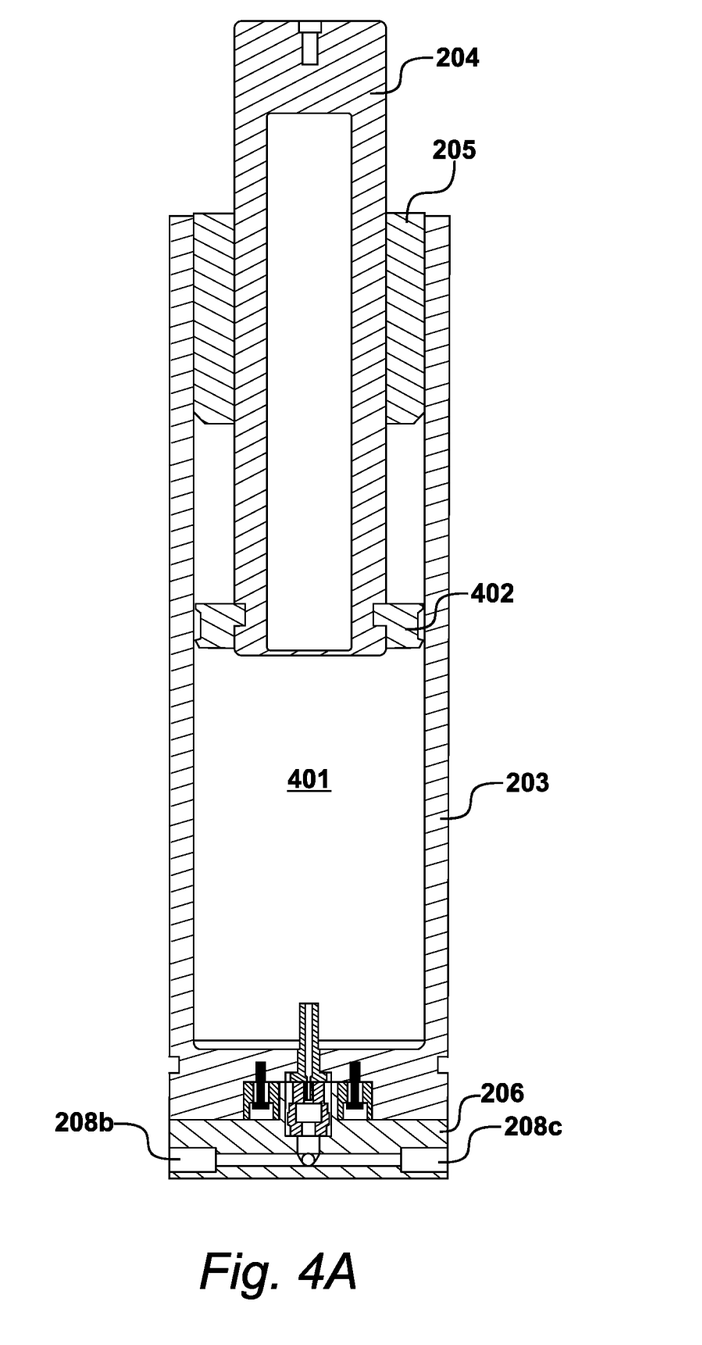
FIGS. 4A and 4B show the gas spring in side cross-sectional and partial exploded side cross-sectional views respectively.
Figure 4B:
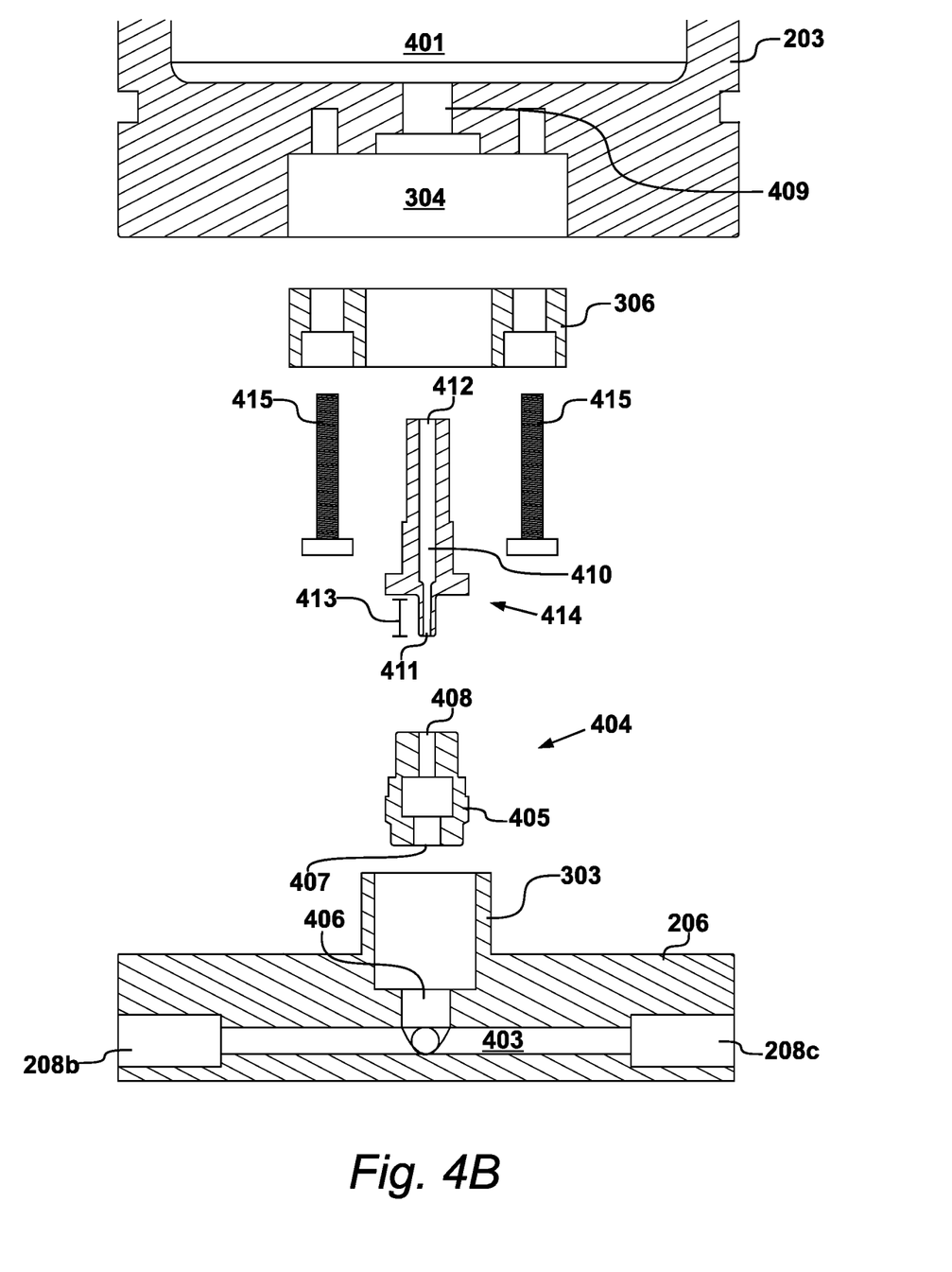

FIGS. 4A & 4B

Gas spring 101 is shown in a side cross-sectional view in FIG. 4A in the engaged condition and in a partial exploded side cross-sectional view in FIG. 4B.

Referring to the Figures, and in particular FIG. 4A, as previously described said housing 203 defines internally a substantially cylindrical compression chamber 401 suitable for containing an operating fluid, in the embodiment nitrogen gas, and within which the piston 204 may reciprocate. As shown in the Figure, in the specific embodiment, said gas spring 101 is constructed such that said compression chamber 401 is effectively a single chamber within which the piston 204 moves. Thus, said piston assembly 204 comprises a single-piece piston/rod arrangement of uniform cross-section along its length that may reciprocate within the housing 203 and which extends out of the housing 203 through an opening in one axial end.

A piston ring 402 is provided annular about the proximal end of the piston 204 which permits fluid flow thereacross, i.e. the piston ring does not form a fluid-tight seal with the interior wall of the housing 203. As will be understood, insertion of the piston 204 into the chamber 401 to a greater extent, i.e. movement of the piston 204 towards a fully retracted condition, increases the volume of the piston 204 that is present within the chamber 401, and so increases the fluid pressure within the chamber 401, thus resisting further insertion of the piston 401, and exerting a restorative force on the piston tending to move the piston outwardly of the housing 203. This type of cylinder is used particularly, though not exclusively, as a spring/damper type cylinder. Again, though not always true, typically a pneumatic cylinder of this construction may be used as a 'spring', whilst a hydraulic cylinder of this construction may be used as a 'damper'.

This construction might be contrasted to a construction in which the piston includes a piston ring which defines a substantially fluid tight seal with the inner cylindrical surface of the compression chamber, such that the piston fluidly isolates the compression chamber on a first side of the piston to the compression chamber on a second side of the piston creating in effect a two-part chamber. Such cylinders may be used to produce linear force by introducing a gradient in the fluid pressure across the piston ring such that the piston is caused to move to equalise the pressure. This type of cylinder is particularly useful as a 'ram' type cylinder, and more particularly a 'double-acting' ram cylinder, in which the motion of the piston may be driven both towards the extended position and the retracted position dependent on the direction of the pressure gradient. It will of course be appreciated that the present invention may alternatively embody a linear actuator having this second described construction.

As previously described, said gas spring 101 is configured such that said cylinder portion 201 may be readily engaged and disengaged from said base portion 202. As described with reference to FIG. 3, the primary reason for this is to allow ready reconfiguration of the plurality of gas springs in an array so as to allow adjustment of the blank-holder force distribution pattern without the need to, for example, reconfigure hard pipes 103 supplying nitrogen gas to each gas spring 101 in the array. Thus, as will be appreciated, cylinder portion 201 is configured to be readily separable from said base portion 202, such that said cylinder portion 201 may be separated from one base portion (which base portion is fixed in position to a bed of a pressing machine) and engaged with an alternative base portion installed on the press bed at a suitable position to provide the required blank-holder force distribution (as will be described further with reference to FIGS. 6A and 6B.

In certain circumstances it is desirable that the plurality of gas springs in the array are fluidly coupled to a remote gas supply via hard-pipes 103 in a 'full loop' configuration, i.e. such that only one inlet/outlet pipe is required between the remote gas supply and the array of gas springs (as shown in FIG. 1). Moreover, it is often desirable that the fluid coupling between the each gas spring in the array and the central control unit 102 (interposed between the remote gas supply and the array) is un-switched, that is to say, the hard pipes 103 which connect one of the gas springs in the array directly to the central control unit, and which connect the remaining gas springs in the array to that first gas spring, effectively form a common manifold coupling each gas spring in the array to the remote gas supply.

It will thus be appreciated that, disengagement of the cylinder portion 201 of one of said gas springs 101 in the array from the base portion 202 breaks the fluid coupling between the second base port 301 and the cylinder port 302. For an array of gas springs in the above described configuration, i.e. a 'full loop' configuration, such a break in the fluid coupling between the base portion and cylinder portion of any one gas spring in the array, or more particularly the omission of a cylinder portion from a base portion in the array, would result in the system going 'open circuit'. That is to say, if a cylinder portion were removed from a base portion in order to eliminate the application of a force on the blank-holder in that location, such that a base portion in the array was not engaged with its corresponding cylinder portion leaving the second base port of the redundant base portion open to the atmosphere, nitrogen gas supplied to the springs in the array via the hard pipes 103 would tend to be vented to atmosphere from the second base port 301 of the base portion 202 which is not engaged with a cylinder portion. As a result, the remaining gas springs in the array would be rendered inoperative by the inability of the system to produce sufficient gas pressure.

It is therefore desirable that said gas spring 101 is provided with valve means so as to allow the flow of nitrogen gas to the cylinder portion of that spring, and more particularly to allow the flow of nitrogen gas from the second base port 301 of the base portion 202 of that spring, to be 'shut off' when the cylinder portion 201 of a spring in the array is removed from the base portion 202. Thus, in the specific embodiment, said base portion 202 is provided with a valve mechanism for controlling the flow of nitrogen gas between said first base port 208a and said second base port 301, and more particularly for controlling the flow of nitrogen gas through said second base port 301.

Referring in particular to FIG. 4B, in the embodiment said main body 206 of said base portion 202 defines said first base ports 208a, 208b, 208c, 208d, and a passage 403 which defines a common manifold extending therebetween mutually fluidly coupling the first base ports 208a, 208b, 208c, 208d, and also fluidly coupling the first base ports 208a, 208b, 208c, 208d with the second base port 301. As previously described with reference to FIG. 1, the plurality of said first base ports 208a, 208b, 208c, 208d, assists in 'daisy chain' coupling of the plurality of gas springs in the array, such that only one gas spring in the array need be provided with a hard pipe directly coupled to the remote gas supply, and the other gas springs in the array may be fluidly coupled to the common manifold 403 of that first gas spring. It will of course be appreciated however that, particularly where a gas spring is not intended for installation in an array comprising a plurality of like units, the base portion may define only a single first base port, such as first base port 208a.

In the specific embodiment, in order to address the problem noted above that would be encountered if one or more base portions 202 in an array were not engaged with a corresponding cylinder portion 201, said base portion 202 comprises a valve device 404 operable to control the flow of fluid through said second base port 301. In the embodiment, said valve device 404 comprises a valve body 405 defining inlet and outlet openings 407, 408 respectively and a passage therebetween (as is conventional of valve construction). As will be described, in the specific embodiment, the valve device 404 is located relative to said main body 206 of said base portion 202 such that said outlet 408 of said valve device itself defines said second base port 301. As shown more clearly in FIG. 4A, in the specific embodiment, said valve device 404 is interposed in an opening 406 of said common manifold 403, the inlet 407 of said valve device 404 defining a substantially fluid-tight seal with said opening 406.

It should be appreciated that the above description of the inlet 407 and outlet 408 openings of the valve device is based on fluid flowing through the valve body generally from the base portion into the cylinder portion, i.e. during charging of the compression chamber 401 with gas. It will of course be appreciated however that during discharging of the chamber 401 the direction of gas flow is reversed, i.e. gas flows from the cylinder portion 201 to the base portion 202 in the opposite direction through the valve 404, and in this circumstance it will be understood that the inlet 407 becomes the outlet 408, and vice versa.

In the specific embodiment, said valve device 404 is configured as a 'shut-off' type valve, actuatable between an 'open' condition in which the flow of nitrogen gas through the valve between the inlet 407 and the outlet 408 is permitted, and a 'closed' condition in which the flow of nitrogen between the inlet 407 and outlet 408 is substantially prevented. In the specific embodiment, in the 'closed' condition, the flow of nitrogen through the valve in a flow direction from the inlet 404 to the outlet 408 is substantially prevented. In the specific embodiment, said valve device is biased towards the 'closed' condition by a biasing means sufficient to counter any 'opening' force exerted on the valve device by the nitrogen gas present in the common manifold 403. In the embodiment, said valve device 404 is threadably received in said opening 406. Thus, it will be appreciated that, in a rest state, the valve 404 is configured to be biased towards a closed condition in which the flow of gas at the stated pressures is substantially prevented.

Preferably, the valve device 404 is constructed and arranged relative to the main body 206 of the base portion 202 such that it is caused to be actuated towards an open condition (and retained in the open condition) when said cylinder portion 201 and said base portion 202 are in the engaged condition. Typically, this will require that said valve device is positioned and constructed such that a valve member within the valve device is moved to a position such that fluid flow through the valve body 405 is permitted, by contact with said cylinder portion 201 when the cylinder portion 201 is engaged with said base portion 202. In this respect, it will be appreciated that said collar 303 and said recess 304 comprising guide ring 306, have the further purpose of ensuring correct alignment of said cylinder portion 201 with said base portion 202 to ensure that the valve device 404 is so actuated to the open condition when the cylinder portion 201 is engaged with the base portion 202.

In the specific embodiment, said housing 203 of said cylinder portion 201 further comprises an actuating member 414, at least part of the actuating member 414 projecting outwardly of an exterior surface of the housing 203, the actuating member being configured to act upon the valve device 404 in such a way as to cause the valve device 404 to actuate towards the open condition when the cylinder portion 201 and the base portion 202 are in the engaged condition. Referring to the Figures, in the embodiment said actuating member 414 takes the form of an elongate generally tubular insert threadably received in an opening 409 defined in the end face of said recess 304 in the axial end 305 of said housing 203. The Tubular insert 414 defines internally a passage 410 extending between an inlet 411 and an outlet 412. In the embodiment, said actuating member 408 is located relative to said housing 203 such that said inlet 411 of said actuating member 414 is said cylinder port 302.

As illustrated, said actuating member 414 is installed in said opening 409 such that said outlet 412 is in fluid communication with said compression chamber 401. Further, said passage 410 fluidly communicates said inlet 411 with said outlet 412, such that said inlet 411 is fluidly coupled to said compression chamber 401. Said actuating member 414 defines a spigot portion 413, which spigot portion 413 defines said inlet 411. Said spigot portion 413 is configured for insertion in said outlet 408 of said valve device 404 in a way such as to fluidly couple said passage 410 of said actuating member 414 with said valve device 404 and in a way as to actuate the valve device 404 to the open condition. In the embodiment, the outer width dimension of said spigot portion 413 is closely matched to the inner width dimension of said outlet 408 of said valve device 404, such that a substantially fluid tight seal is formed therebetween when the spigot portion 413 is so received in the outlet 408.

Thus, as will be understood, in the embodiment the function of said generally tubular actuating member 414 is two-fold; firstly to fluidly couple the compression chamber 401 of the cylinder portion 201 with the common manifold 403 (which common manifold 403 is in turn in fluid communication with said first base port 208a), and secondly to actuate the valve device 404 to the open condition when the cylinder portion 201 is engaged with the base portion 202 thereby causing the spigot portion 413 to be inserted through said outlet 408. In a preferred embodiment, the spigot portion 413 is configured to engage a valve member within the valve device 404 when so inserted through outlet 408, thereby causing the valve device to be in the open condition when the cylinder portion 201 is engaged with the base portion 202. In a preferred embodiment, the actuating member 414 and the valve device 404 are configured such that the valve device 404 is not actuated to the open condition by the spigot portion 413 until a fluid tight seal is defined between the inlet 411 of the actuating member 414 (the cylinder port 302) and the outlet 408 of the valve device 404 (the second base port 301).

As will be appreciated, said valve device 404 is biased in the closed condition, is configured to remain in the closed condition until actuated by the actuating member 408, and is configured to 'automatically' revert to the closed condition when the cylinder portion 201 is disengaged from the base portion 202. Thus, valve device 404 is of the type often referred to as an 'auto shut-off' valve.

As will be understood, in the specific embodiment described herein, said valve device 404 is a two-way type valve in which fluid (in this case nitrogen gas) may flow freely through the valve when in the open condition. In an alternative embodiment, said valve 404 may be configured as a 'check' valve, often referred to as a 'one-way' valve. In such an embodiment, the valve may be permitted to allow gas to flow only in a direction from the inlet 407 towards the outlet 408, with reverse flow prevented.

More particularly, in an alternative embodiment the valve device 404 may be configured to be actuatable between an open condition and a closed condition, and be biased in the closed condition, but may be configured such that even in the open condition gas may flow only in one direction through the valve, i.e between the inlet and the outlet. In such an embodiment, the compression chamber 401 may be charged with nitrogen gas through said valve 404, but discharge of gas from the compression chamber would not be permitted through the valve. Use of such a 'check' valve may be advantageous, in particular, where gas pressure within the compression chamber 401 during operation is high, so as to cause the compression chamber to be isolated from the hard pipes 103 and remote gas supply during operation and to prevent inadvertent discharge of gas from the compression chamber through the valve. In such a scenario, the discharge of gas from the compression chamber 401 could be achieved by separation of the cylinder portion 201 from the base portion 202, such that gas may be vented to atmosphere via said cylinder port 302.

With particular reference to FIG. 4B, in the embodiment said guide ring 306 is retained in said recess 304 by way of fixing screws 415.

In the preferred embodiment, said valve device 404 has an internal mechanism in which a 'poppet' type valve member is movable within the valve body, and arranged so as to be selectively brought into and out of engagement with an associated valve seat, thereby placing the valve device in the 'closed' and 'open' conditions respectively. The valve mechanism may further comprise a biasing member, in the form of, for example, a biasing spring, biasing the poppet valve member in the closed condition. It will of course be appreciated however that said valve device 404 may take any one of a number of possible constructions, with the principal requirement being that it should preferably be (a) biased towards a closed condition, and (b) constructed so as to be conveniently actuatable towards an open condition by engagement of the cylinder portion 201 with the base portion 202. As noted, in an embodiment, said valve device 404 may additionally be configured as a 'check' valve and include means for preventing reverse flow through the valve.

Figure 5:
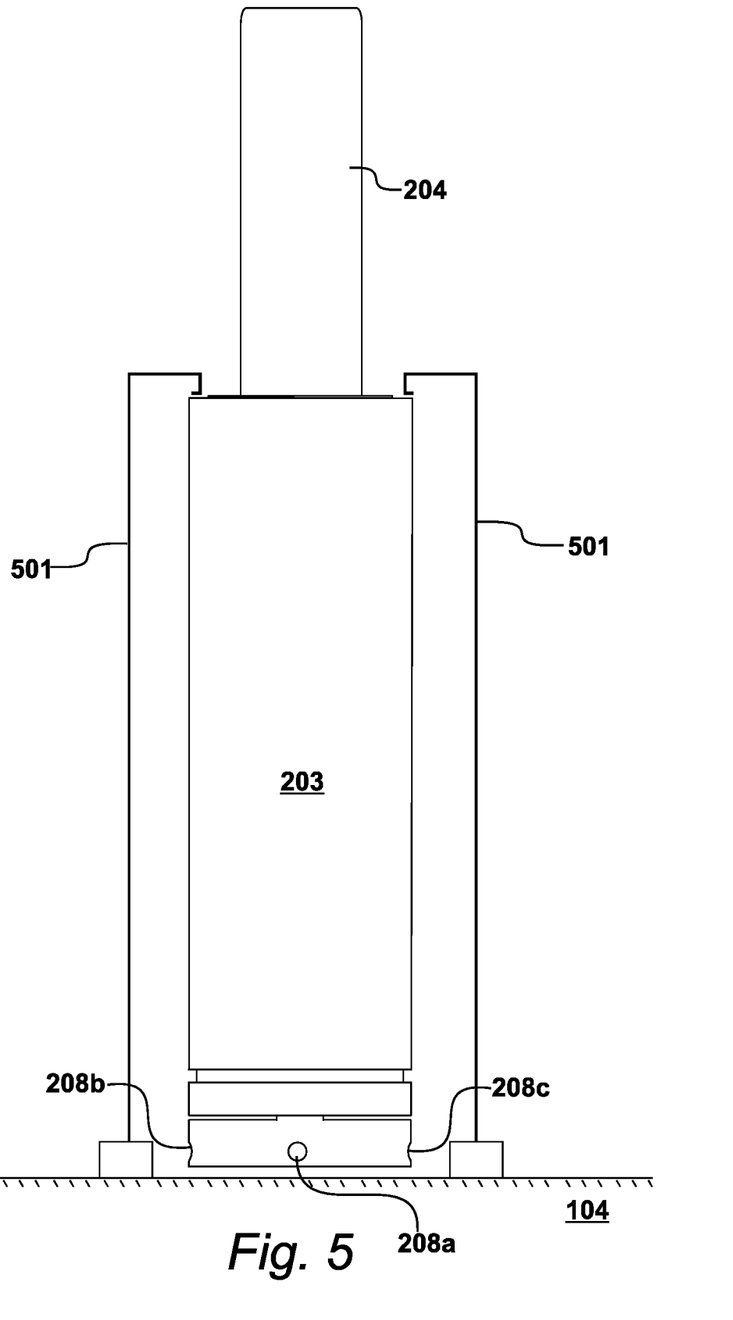
FIG. 5 shows the gas spring in a side elevation view.

FIG. 5

Gas spring 101 is shown schematically in a side elevation view in FIG. 5.

In FIG. 6 the gas spring 101 is shown in an operational condition, in which the cylinder portion 201 and the base portion 202 are in the engaged condition, and in which the gas spring is mounted to the bed 104 of a press machine.

Referring to the Figure, said base portion 202 is secured to the press bed 104 by way of bolts (not shown). It will of course be appreciated however that, whilst the base portion 202 is securely attached to the press bed 104, the cylinder portion 201 is only retained in engagement with the base portion 202 by way of the force of gravity acting downwardly on the cylinder portion. It will be understood that, in use, movement of the piston 204 within the housing 203 may tend to cause the cylinder portion 201 to 'jump' with respect to the base portion 202, which could result in advertent disengagement of the cylinder portion from the base portion, and moreover damage to either part (and in particular to the actuating member 414 and the valve device 404).

Thus, in the specific embodiment illustrated, said gas spring 101 is further provided with securing means in the form of a pair of like clamps 501, configured to engage the cylinder portion 201 directly to thereby secure it to the press bed 104. As illustrated, in the specific embodiment said clamp 501 is configured to engage the uppermost axial end surface of the cylinder portion 201 only.

Figure 6A:
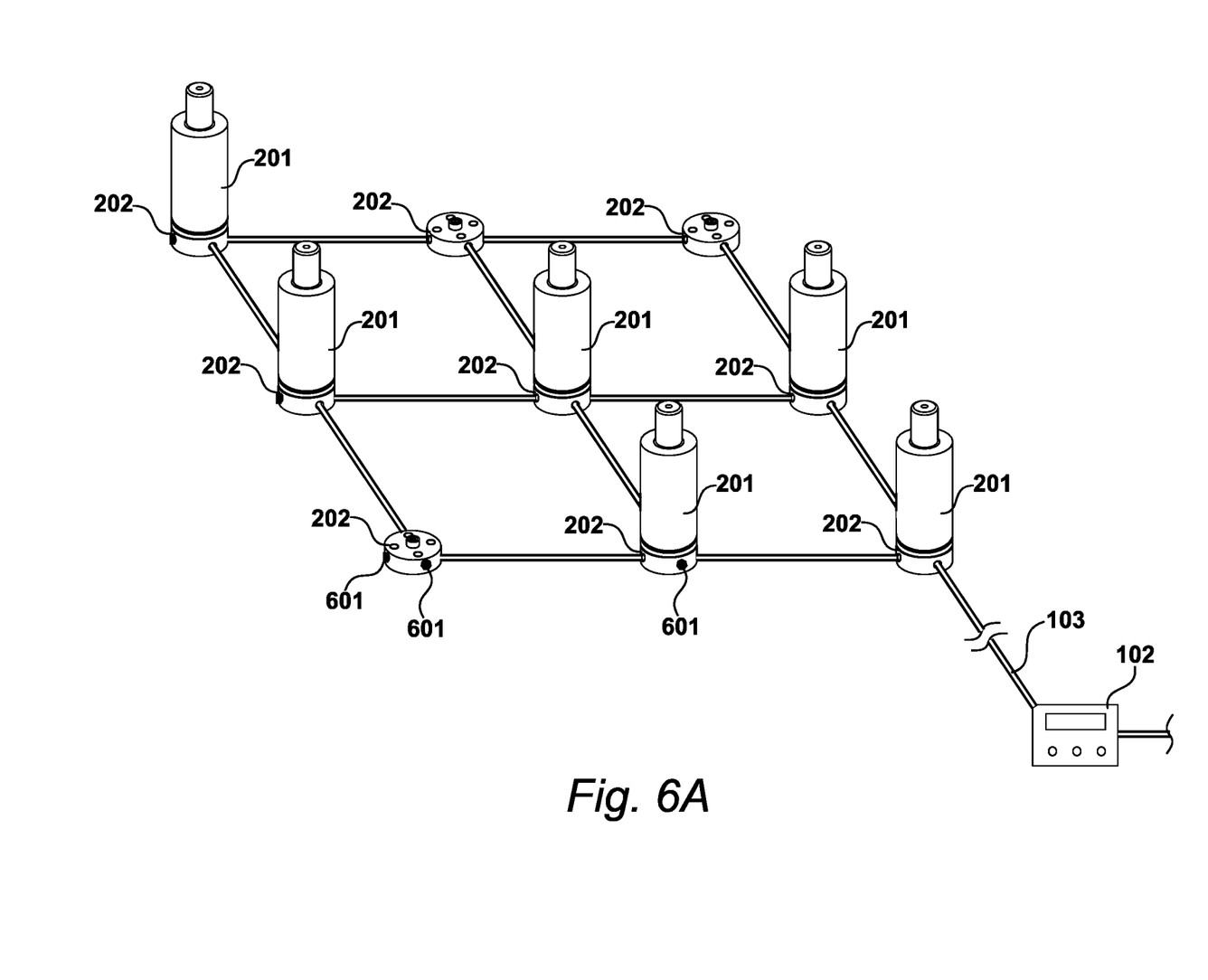
FIGS. 6A and 6B show an array of gas springs in first and second configurations.
Figure 6B:
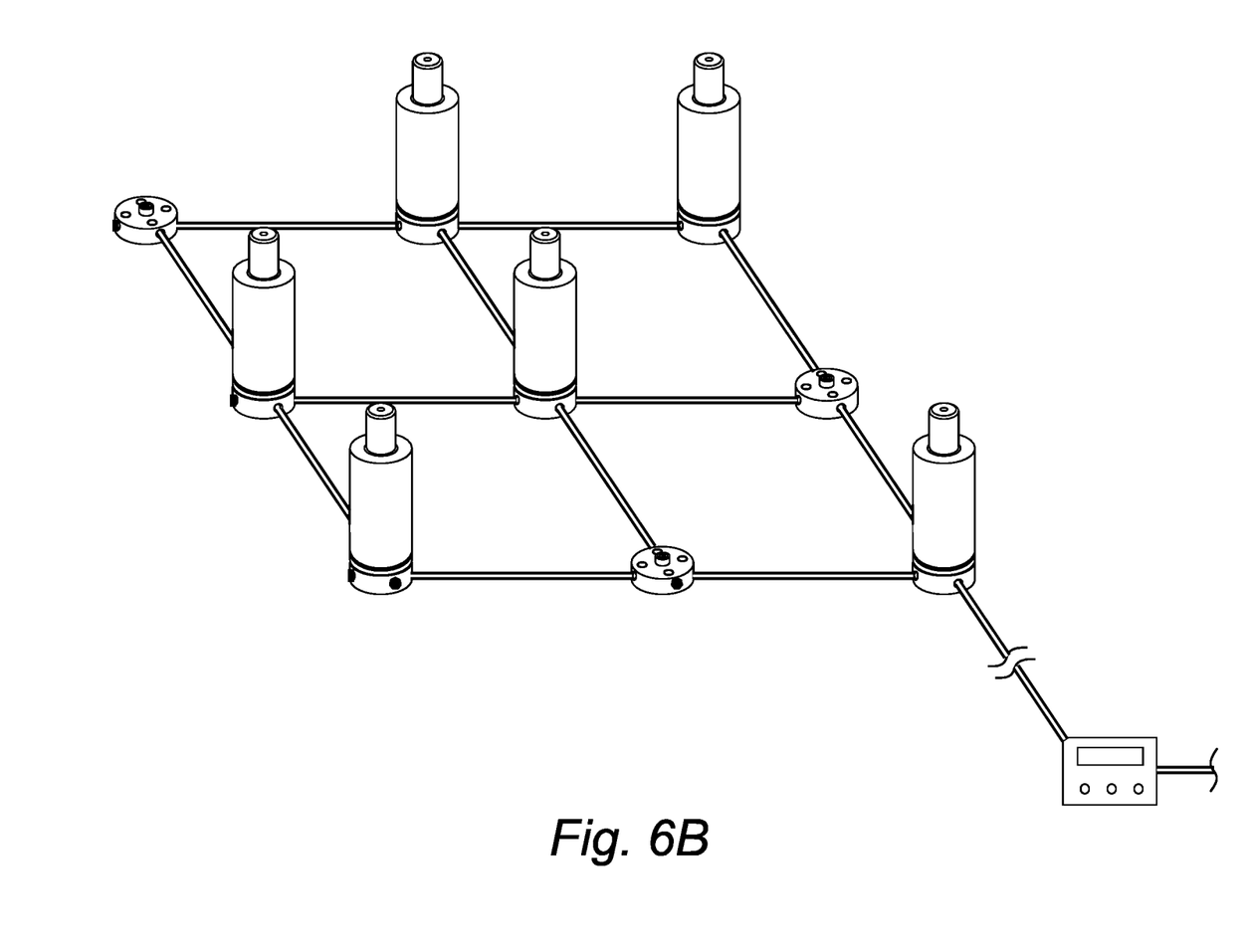

FIGS. 6A & 6B

The array of gas springs 101 previously described with reference to FIG. 1 is shown in FIGS. 6A and 6B.

As previously described, in the specific embodiment said gas spring 101 is intended for arrangement with a plurality of other like gas springs to form an array configured for use in substitute of a pressing machine press cushion. The plurality of gas springs allows localized control of the force exerted on the blank-holder, and allows the distribution of the force exerted on the blank-holder to be varied. This ability to vary the distribution of the force exerted on the blank-holder by the array of gas springs usefully allows the force distribution to be optimised dependent on the shape and profile of the part to be pressed. As an example, a perfectly circular concave shallow pressing may require an even distribution of force to be applied about the blank-holder, whilst an irregular shaped pressing, for example, an irregular 'deep draw' pressing, may require the blank holder force to be reduced about the deepest areas of the pressing, whilst maintaining a fixed average blank-holder force.

As an example, it is envisaged by the present applicant that a kit of parts for constructing gas springs for a press cushion may be provided to a customer, the kit of parts comprising, for example, one-hundred of said base portions 202, but only twenty of said cylinder portions 201. This ratio may be desirable as it allows the one-hundred (relatively inexpensive) base portions to be (relatively permanently) securely fixed to the bed 104 of the press machine, for example, by bolting or welding, and for the hard pipes 103 supplying nitrogen gas to those base portions to be constructed. As an example, it is possible that the one-hundred base portions may be installed on a press bed in a square array.

It is likely however that, for any single pressing, in fact only twenty gas springs will be required to be in contact with the blank-holder in order to exert the required blank-holder force with the required localized control of the force distribution. Thus, for any single pressing, only twenty of said (relatively complex and expensive) cylinder portions 201 are required. For the next pressing to be pressed by the machine, it is possible that only the same twenty gas springs will be required, but that those twenty gas springs may be required to exert their retarding/restorative force at different positions on the blank-holder than with the first pressing. That being the case, the twenty cylinder portions may be moved to base portions installed closest to the desired position of the force on the blank-holder.

It will thus be appreciated that one advantage of the present invention is simply a reduction in cost of a system of gas springs used for replicating the press-cushion of a press machine. With gas springs of the prior art, if the replica press-cushion were required to be capable of exerting twenty pressure points on the blank-holder in more than one configuration, more than twenty complete gas springs would be required to be permanently installed on the press bed, with a number of (expensive) gas springs always being redundant in each pressing operation. The present invention in contrast would allow for only twenty cylinder portions to be arranged in as many different configurations as may be required, with only a large number of (relatively simple) base portions required.

Thus, referring to FIG. 6A, in the illustration nine of said base portions 202 have been secured to the bed of a press machine 104 in a square 3×3 array, the plurality of base portions being connected to a remote gas supply by hard pipes 103, and the plurality of base portions being fluidly coupled together in a 'daisy chain' manner. For the particular pressing to be pressed by the machine however, the required degree of control of the blank-holder force distribution may be obtained using only, for example, six gas springs, and so only six of said cylinder portions 201 are engaged with only six of the base portions 202. The remainder of the base portions 202 are in a redundant state, in which they are not engaged with a cylinder portion 201. Nitrogen gas at the operating pressure of the system (typically in excess of 50 Bar) is present in the common manifold of each said base portion 202 (which together with the hard pipes 103 define a fluid circuit), but is prevented from escaping from the second base port 301 of each said base portion by the valve device which is biased in the closed condition. In contrast, the six cylinder portions 201 which are engaged with base portions 202 each actuate the valve device of those base portions to an open condition, in which the compression chamber 401 defined internally of each cylinder portion is fluidly coupled to the first base port 208a of each base portion (and so to the hard pipes and the remote gas supply).

Referring to FIG. 6B, the same arrangement of said base portions 202 is shown, along with the same six cylinder portions 201, however it will be noted that a number of the cylinder portions 201 have been disengaged from their original base portions, and have been engaged with differently positioned base portions, so as to exert a differently distributed force on the pressing machine blank-holder. As will be understood, on disengagement of the cylinder portions 201 from their original base portions, the valve devices of the original base portions reverted to their closed condition, and on engagement of the cylinder portions 201 with their new base portions, the valve devices in the new base portions were actuated towards their respective open conditions.

As will be understood, engagement of said cylinder portion 201 with said base portion 202 is achieved by lowering of said cylinder portion on to said base portion such that said collar 303 is received in said recess 304.

As illustrated, plugs 601 are installed in first base ports of base portions which do not receive hard pipes 103 in order to prevent fluid passage through those redundant ports.

Preferably, said actuating member defines said cylinder port. Preferably, an opening of said actuating member defines said cylinder port. Preferably, said actuating member is a generally tubular member configured for partial insertion in said second base port. Preferably, said generally tubular actuating member has an outer width dimension closely corresponding to an inner width dimension of said second base port, such that a substantially fluid-tight seal is formed therebetween when said generally tubular actuating member is so partially inserted in said second base port. Preferably, said guide ring comprises of a material having a different hardness characteristic to the material from which said flange of said base portion is constructed. Preferably, said first base port is configured for fluid communication with a remote supply of a working fluid. Preferably, said working fluid is a gas. Preferably, said working fluid is nitrogen gas. Preferably, said gas springs further comprise securing means for securing said linear actuator to a support surface when said cylinder portion and said base portion are in said engaged condition. Preferably, said securing means is a clamp mechanism configured to engage said cylinder portion to thereby secure said linear actuator to a support surface. Preferably, said clamp mechanism is configured to engage an uppermost surface of said cylinder portion. Preferably, said linear actuator is a pneumatic cylinder. Preferably, said linear actuator is configured as a spring.

What we claim is:

1. A linear actuator comprising:
a cylinder portion and a base portion;
the cylinder portion comprising a housing defining internally a compression chamber for containing a fluid and comprising a piston assembly that can reciprocate within the compression chamber, said housing further defining a cylinder port in fluid communication with said compression chamber;
the base portion defining a first base port and a second base port and a passage extending therebetween fluidly communicating said first base port with said second base port, and comprising a valve operable to control the flow of fluid through said second base port, in which said valve is actuatable between an open condition in which the flow of fluid through the second base port is permitted and a closed condition in which the flow of fluid through the second base port is prevented; in which
said cylinder portion is releasably engageable with said base portion such that said cylinder portion and said base portion may be arranged in an engaged condition in which engaged condition said cylinder port and said second base port are in fluid communication, and in which
said valve is configured to automatically actuate to said closed condition in which the flow of a fluid across the valve is prevented when said cylinder portion and said base portion are in a disengaged condition, wherein said cylinder portion comprises an actuating member configured to act upon said valve in a way to actuate said valve towards said open condition when said cylinder portion and said base portion are in said engaged condition.

2. The linear actuator of claim 1, in which a fluid-tight seal is formed between said cylinder port and said second base port when said cylinder portion and said base portion are in said engaged condition.

3. The linear actuator of claim 1, in which said cylinder portion and said base portion are configured as to be engageable from a disengaged condition to said engaged condition and separable from said engaged condition to a disengaged condition in a way that the fluid coupling between the cylinder port of the cylinder portion and the second base port of the base portion is made or broken by the said engagement and disengagement procedures respectively without requiring a separate manual operation.

4. The linear actuator of claim 1, in which said housing of said cylinder portion defines a recess projecting inwardly from an exterior surface thereof, in which said recess of said cylinder portion is generally cylindrical in form.

5. The linear actuator of claim 4, in which said base portion defines a flange projecting outwardly from an exterior surface thereof, said flange defining a generally tubular collar annular about said second base port having outer width and depth dimensions corresponding to inner width and depth dimensions of said recess defined by said cylinder portion, and in which said flange of said base portion is configured to be partially received in said recess of said cylinder portion when said cylinder portion and said base portion are in said engaged condition.

6. The linear actuator of claim 4 in which said cylinder portion further comprises an annular guide ring installed in said recess annular about said second port.

7. The linear actuator of claim 6, in which said guide ring comprises of a material having a lower hardness characteristic to the material from which said flange of said base portion is constructed.

8. The linear actuator of claim 6, in which said guide ring is releasably installed in said recess so as to permit removal of said guide ring therefrom.

9. The linear actuator of claim 1 in which said valve is a valve device.

10. The linear actuator of claim 1, in which said valve is biased towards said closed condition.

11. The linear actuator of claim 1, in which said valve is a one-way valve.

12. The linear actuator of claim 1, in which said base portion comprises a main body.

13. The linear actuator of claim 12, in which said valve is constructed and arranged relative to the main body of said base portion to be actuated towards said open condition when said cylinder portion and said base portion are in said engaged condition.

14. The linear actuator of claim 1, in which said actuating member is configured to engage said valve to act upon said valve in a way to actuate said valve towards said open condition when said cylinder portion and said base portion are in said engaged condition.

15. The linear actuator of claim 1, in which said actuating member projects outwardly of an exterior surface of said cylinder housing.

16. The linear actuator of claim 1, in which said linear actuator is a gas spring.

17. A kit of parts for assembling a linear actuator, the kit comprising:
   a cylinder portion and a base portion;
   the cylinder portion comprising a housing defining internally a compression chamber for containing a fluid and comprising a piston assembly that can reciprocate within the compression chamber, said housing further defining a cylinder port in fluid communication with said compression chamber;
   the base portion defining a first base port and a second base port and a passage extending therebetween fluidly communicating said first base port with said second base port, and comprising valve suitable for controlling the flow of fluid through said second base port, in which said valve is actuatable between an open condition in which the flow of fluid through the second base port is permitted, and a closed condition in which the flow of fluid through the second base port is prevented; in which
   said cylinder portion is releasably engageable with said base portion such that said cylinder portion and said base portion may be arranged in an engaged condition in which engaged condition said cylinder port and said second base port are in fluid communication, and in which
   said valve is configured to automatically actuate to said closed condition in which the flow of a fluid across the valve is prevented when said cylinder portion and said base portion are in a disengaged condition, and in that said cylinder portion comprises an actuating member configured to act upon said valve means in a way to actuate said valve means towards said open condition when said cylinder portion and said base portion are in said engaged condition.

\* \* \* \* \*